(12) United States Patent
Zhang et al.

(10) Patent No.: US 10,891,361 B2
(45) Date of Patent: Jan. 12, 2021

(54) DEVICE WITH A CAMERA FOR REAL-TIME RISK DETECTION OF PASSWORD LEAKAGE

(71) Applicant: CITRIX SYSTEMS, INC., Fort Lauderdale, FL (US)

(72) Inventors: Cheng Zhang, Jiangsu (CN); Yang Qian, Jiangsu (CN); Qin Zhang, Jiangsu (CN); Lin Liu, Jiangsu (CN)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 171 days.

(21) Appl. No.: 16/042,090

(22) Filed: Jul. 23, 2018

(65) Prior Publication Data

US 2020/0026832 A1 Jan. 23, 2020

(51) Int. Cl.
*G06K 9/00* (2006.01)
*G06F 21/32* (2013.01)
*G06F 21/45* (2013.01)
*H04L 29/06* (2006.01)
*G06F 21/84* (2013.01)

(52) U.S. Cl.
CPC .............. *G06F 21/32* (2013.01); *G06F 21/45* (2013.01); *G06F 21/84* (2013.01); *G06K 9/00288* (2013.01); *G06K 9/00671* (2013.01); *H04L 63/101* (2013.01); *H04L 63/102* (2013.01)

(58) Field of Classification Search
None
See application file for complete search history.

(56) References Cited

U.S. PATENT DOCUMENTS

| 9,176,744 | B2 | 11/2015 | Lee |
| 9,538,345 | B2 | 1/2017 | Sah et al. |
| 2005/0104731 | A1* | 5/2005 | Park ....................... H04K 3/822 340/572.1 |
| 2017/0345027 | A1* | 11/2017 | Saitou ................ G06K 9/00268 |

OTHER PUBLICATIONS

ATM surveillance: Preserving the ATM, protecting the customer Jun. 19, 2015, https://www.atmmarketplace.com/articles/atm-surveillance-preserving-the-atm-protecting-the-customer/ (Year: 2015).*

(Continued)

*Primary Examiner* — Randolph I Chu
(74) *Attorney, Agent, or Firm* — Allen, Dyer, Doppelt + Gilchrist, PA

(57) ABSTRACT

A computing device includes a camera, a memory and a processor. The memory includes a grant list and a risk list stored therein. The processor executes a user application that requires sensitive information to be entered by the user, and activates the camera prior to the sensitive information being entered. The processor operates an analyze engine to analyze an image as provided by the activated camera, validates the user based on the analyzed image and at least one face ID in the grant list, and alerts the user of a risk for leakage of the sensitive information to be entered into the user application based on detection of at least one object in the analyzed image that is in the risk list.

20 Claims, 6 Drawing Sheets

(56) References Cited

OTHER PUBLICATIONS

Ramkumar V, "Automated Object Detection and Suspicious Behavior Alert in ATM Using Embedded System", International Journal of Advanced Research in Biology, Ecology, Science and Technology (IJARBEST) vol. 1, Issue 1, Apr. 2015 (Year: 2015).*

H. Sako and T. Miyatake, "Image-recognition technologies towards advanced automated teller machines," Proceedings of the 17th International Conference on Pattern Recognition, 2004. ICPR 2004., Cambridge, 2004, pp. 282-285 vol. 3. (Year: 2004).*

Sujith B, "Crime Detection and Avoidance in ATM: A New Framework", (IJCSIT) International Journal of Computer Science and Information Technologies, vol. 5 (5) , 2014, 6068-6071 (Year: 2014).*

* cited by examiner

DEVICE WITH A CAMERA FOR REAL-TIME RISK DETECTION OF PASSWORD LEAKAGE

TECHNICAL FIELD

The present disclosure relates to computing devices, and more particularly, to a computing device with a camera used for real-time risk detection when sensitive information is to be entered by a user into the computing device.

BACKGROUND

There are a number of scenarios where a user may be required to enter sensitive information into a device. For example, access to certain applications by a user of a computing device may require entry of a password. Another example is entry of a password to conduct a financial transaction at an automated teller machine (ATM).

Entry of passwords are susceptible to leakage. Leakage may result when a person looks over the shoulder of a user as the user types in the password. Even if display of the password as it is entered by the user appears as a series of asterisks, the person can observe the keystrokes made by the user. Leakage may also occur when a room or area is being monitored by a camera. A person viewing the camera may be able to zoom in and observe the user entering the password.

SUMMARY

A computing device comprises a camera, and a memory having stored therein a grant list and a risk list. The grant list includes at least one authorized face ID, and the risk list includes at least one identified object that presents a risk to the user's operating environment. A processor is coupled to the memory and the camera to execute a user application that requires sensitive information to be entered by the user, activate the camera prior to the sensitive information being entered by the user, and operate an analyze engine.

The analyze engine is operated to analyze an image as provided by the activated camera, validate the user based on the analyzed image and the at least one face ID in the grant list, and alert the user of a risk for leakage of the sensitive information to be entered into the user application based on detection of at least one object in the analyzed image that is in the risk list. The computing device advantageously allows for real-time risk detection when sensitive information is to be entered by a user of the computing device.

The processor is configured to activate the camera based on hooking an application program interface (API) used to input the sensitive information into the user application. Alternatively, the processor activates the camera based on the user application notifying when the sensitive information is to be entered.

The sensitive information may comprise a password for the user application, for example. The computing device further includes a display, and the processor alerts the user via the display. The processor may block input of the sensitive information based on the alert.

The at least one object that may present a risk to the user's operating environment comprises detection of more than one face in the analyzed image. Another object that may present a risk to the user's operating environment comprises detection of an external camera in the analyzed image.

The camera has a camera view angle defining a protection zone, and the computing device further comprises a display, and an anti-view screen protector carried by the display so that the display cannot be viewed from outside the protection zone.

Another aspect is directed to a method for operating a computing device comprising a camera, and a memory having stored therein a grant list and a risk list. The method comprises operating a processor coupled to the memory and the camera to execute a user application that requires sensitive information to be entered by the user, activate the camera prior to the sensitive information being entered by the user, and operate an analyze engine. The analyze engine is operated to analyze an image as provided by the activated camera, validate the user based on the analyzed image and the at least one face ID in the grant list, and alert the user of a risk for leakage of the sensitive information to be entered into the user application based on detection of at least one object in the analyzed image that is in the risk list.

Yet another aspect is directed to a non-transitory computer readable medium for operating a computing device comprising a camera and a memory having stored therein a grant list and a risk list, and with the non-transitory computer readable medium having a plurality of computer executable instructions for causing the computing device to perform steps as described above.

DETAILED DESCRIPTION

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout.

As will be appreciated by one of skill in the art upon reading the following disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Figure 1:
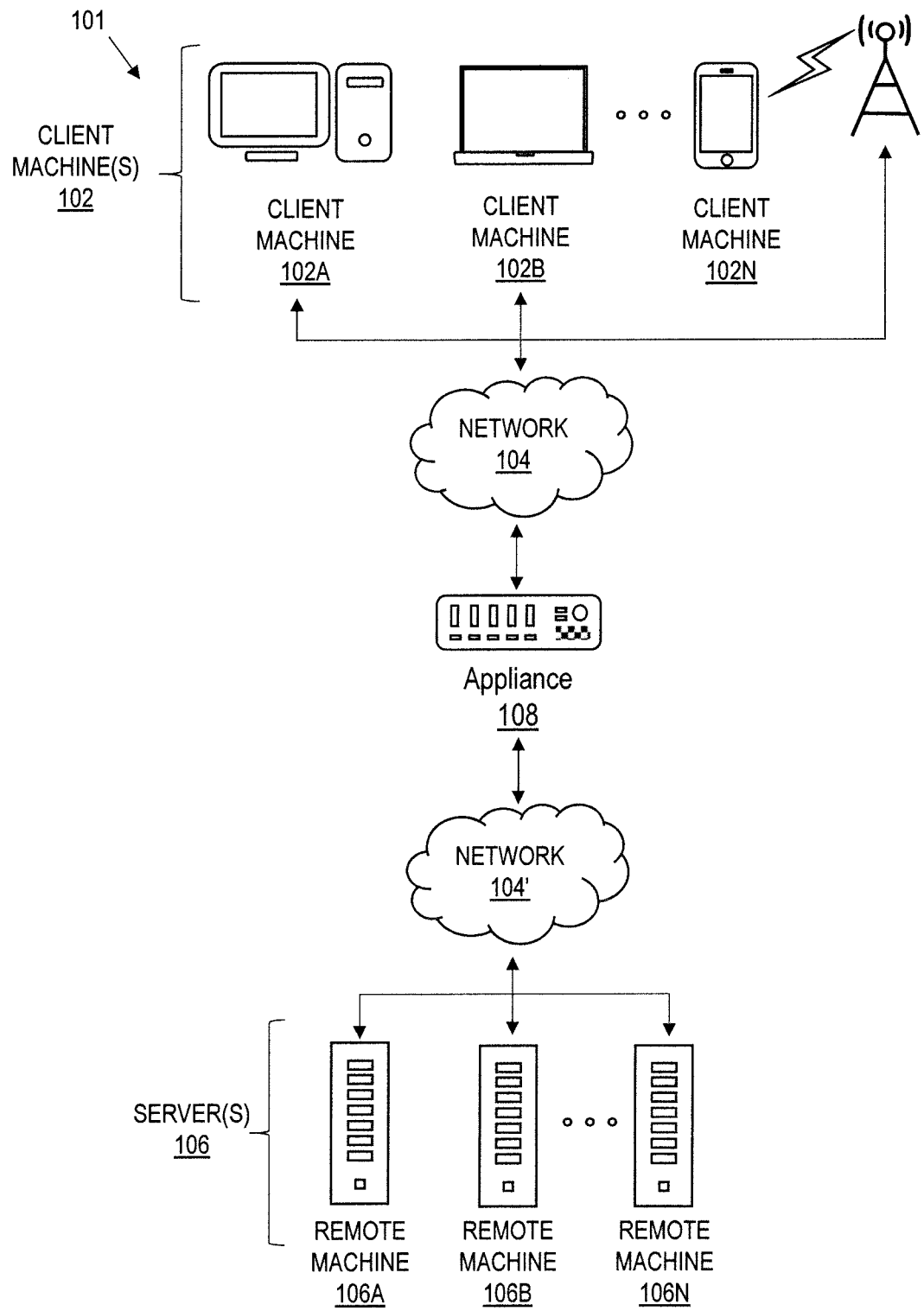
FIG. 1 is a block diagram of a network environment of computing devices in which various aspects of the disclosure may be implemented.

Referring initially to FIG. 1, a non-limiting network environment 101 in which various aspects of the disclosure may be implemented includes one or more client machines 102A-102N, one or more remote machines 106A-106N, one or more networks 104, 104', and one or more appliances 108 installed within the computing environment 101. The client machines 102A-102N communicate with the remote machines 106A-106N via the networks 104, 104'.

In some embodiments, the client machines 102A-102N communicate with the remote machines 106A-106N via an intermediary appliance 108. The illustrated appliance 108 is positioned between the networks 104, 104' and may be referred to as a network interface or gateway. In some embodiments, the appliance 108 may operate as an application delivery controller (ADC) to provide clients with access to business applications and other data deployed in a datacenter, the cloud, or delivered as Software as a Service (SaaS) across a range of client devices, and/or provide other functionality such as load balancing, etc. In some embodiments, multiple appliances 108 may be used, and the appliance(s) 108 may be deployed as part of the network 104 and/or 104'.

The client machines 102A-102N may be generally referred to as client machines 102, local machines 102, clients 102, client nodes 102, client computers 102, client devices 102, computing devices 102, endpoints 102, or endpoint nodes 102. The remote machines 106A-106N may be generally referred to as servers 106 or a server farm 106. In some embodiments, a client device 102 may have the capacity to function as both a client node seeking access to resources provided by a server 106 and as a server 106 providing access to hosted resources for other client devices 102A-102N. The networks 104, 104' may be generally referred to as a network 104. The networks 104 may be configured in any combination of wired and wireless networks.

A server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; or a server executing an application acceleration program that provides firewall functionality, application functionality, or load balancing functionality.

A server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 106 may execute a remote presentation client or other client or program that uses a thin-client or a remote-display protocol to capture display output generated by an application executing on a server 106 and transmits the application display output to a client device 102.

In yet other embodiments, a server 106 may execute a virtual machine providing, to a user of a client device 102, access to a computing environment. The client device 102 may be a virtual machine. The virtual machine may be managed by, for example, a hypervisor, a virtual machine manager (VMM), or any other hardware virtualization technique within the server 106.

In some embodiments, the network 104 may be: a local-area network (LAN); a metropolitan area network (MAN); a wide area network (WAN); a primary public network 104; and a primary private network 104. Additional embodiments may include a network 104 of mobile telephone networks that use various protocols to communicate among mobile devices. For short range communications within a WLAN, the protocols may include 802.11, Bluetooth, and Near Field Communication (NFC).

Figure 2:
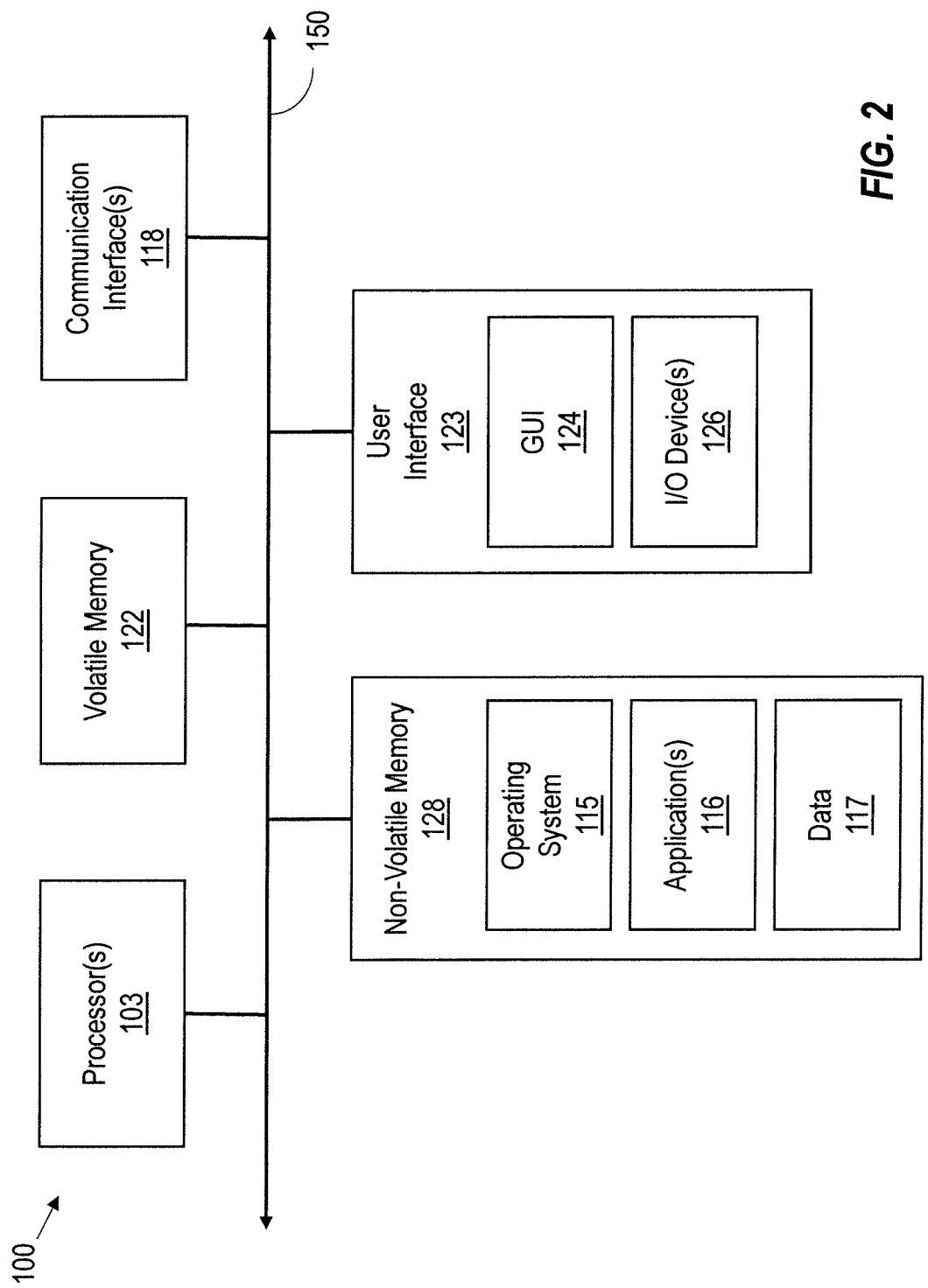
FIG. 2 is a block diagram of a computing device useful for practicing an embodiment of the client machines or the remote machines illustrated in FIG. 1.

FIG. 2 depicts a block diagram of a computing device 100 useful for practicing an embodiment of client devices 102 or servers 106. The computing device 100 includes one or more processors 103, volatile memory 122 (e.g., random access memory (RAM)), non-volatile memory 128, user interface (UI) 123, one or more communications interfaces 118, and a communications bus 150.

The non-volatile memory 128 may include: one or more hard disk drives (HDDs) or other magnetic or optical storage media; one or more solid state drives (SSDs), such as a flash drive or other solid state storage media; one or more hybrid magnetic and solid state drives; and/or one or more virtual storage volumes, such as a cloud storage, or a combination of such physical storage volumes and virtual storage volumes or arrays thereof.

The user interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

The non-volatile memory 128 stores an operating system 115, one or more applications 116, and data 117 such that, for example, computer instructions of the operating system 115 and/or the applications 116 are executed by processor(s) 103 out of the volatile memory 122. In some embodiments, the volatile memory 122 may include one or more types of RAM and/or a cache memory that may offer a faster response time than a main memory. Data may be entered using an input device of the GUI 124 or received from the I/O device(s) 126. Various elements of the computer 100 may communicate via the communications bus 150.

The illustrated computing device 100 is shown merely as an example client device or server, and may be implemented by any computing or processing environment with any type of machine or set of machines that may have suitable hardware and/or software capable of operating as described herein.

The processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor may be analog, digital or mixed-signal. In some embodiments, the processor may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 118 may include one or more interfaces to enable the computing device 100 to access a computer network such as a Local Area Network (LAN), a Wide Area Network (WAN), a Personal Area Network (PAN), or the Internet through a variety of wired and/or wireless connections, including cellular connections.

In described embodiments, the computing device 100 may execute an application on behalf of a user of a client device. For example, the computing device 100 may execute one or more virtual machines managed by a hypervisor. Each virtual machine may provide an execution session within which applications execute on behalf of a user or a client device, such as a hosted desktop session. The computing device 100 may also execute a terminal services session to provide a hosted desktop environment. The computing device 100 may provide access to a remote computing environment including one or more applications, one or more desktop applications, and one or more desktop sessions in which one or more applications may execute.

Additional descriptions of a computing device 100 configured as a client device 102 or as a server 106, or as an appliance intermediary to a client device 102 and a server 106, and operations thereof, may be found in U.S. Pat. Nos. 9,176,744 and 9,538,345, which are incorporated herein by reference in their entirety. The '744 and '345 patents are both assigned to the current assignee of the present disclosure.

Figure 3:
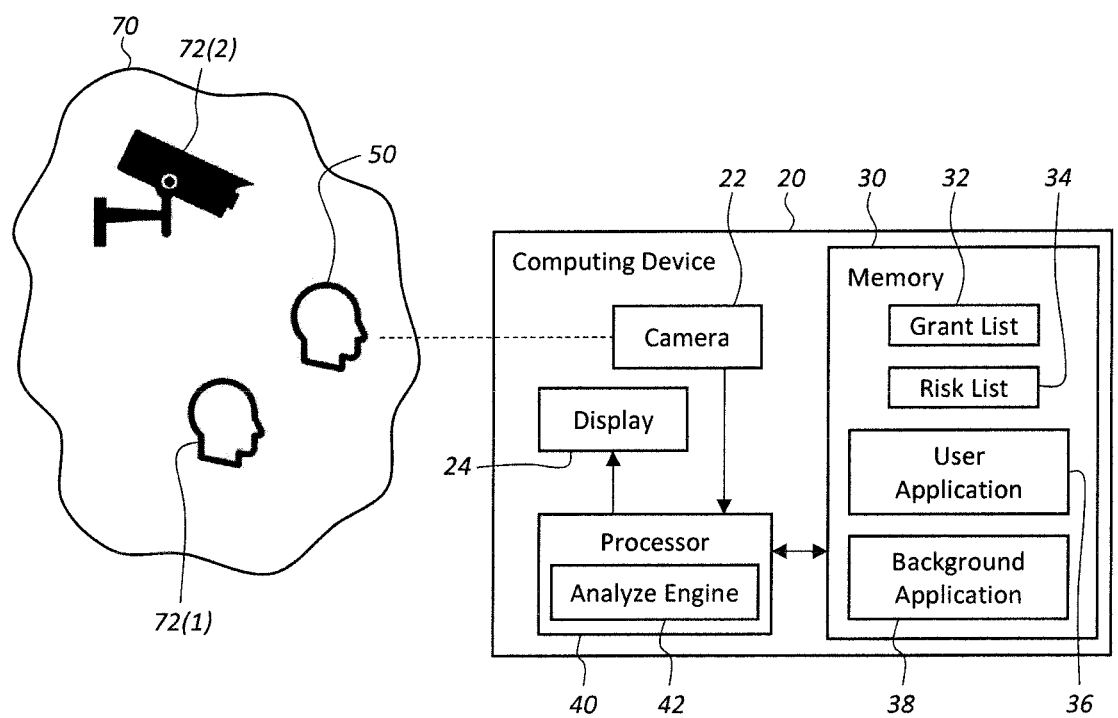
FIG. 3 is a block diagram of a computing device with a camera used for real-time risk detection for password leakage in which various aspects of the disclosure may be implemented.

Referring initially to FIG. 3, a computing device 20 with a camera 22 used for real-time risk detection when sensitive information is to be entered will be discussed. The camera 22 is typically a front camera so as to be directed towards the user 50 of the computing device 20.

The computing device 20 may be a mobile computing device, such as a smart phone, or a desktop computing device, for example. The desktop computing device may be a standalone device or a virtual desktop managed by a hypervisor, for example. In yet other embodiments, the computing device 20 may be an ATM.

As will be explained in detail below, the camera 22 is to be activated prior to the user 50 entering sensitive information. The analyze engine 42 is configured to analyze images from the camera 22, and to alert the user 50 prior to entering the sensitive information if a risk to leakage of the sensitive information is detected. Sensitive information may be user login credentials, such as a user name and password, for example. In other instances the sensitive information may be a password only.

As discussed in the background, a risk to leakage of sensitive information may be when a person looks over the shoulder of the user 50 as the user types the password into the computing device 20. Even if display of the password as it is entered by the user appears as a series of asterisks, the person can observe the keystrokes made by the user. Leakage may also occur when the computing device 20 is in a room or area that is being monitored by an external camera. A person viewing the external camera may be able to zoom in and observe the user 50 entering the password into the computing device 20.

The illustrated computing device 20 includes a camera 22, and a memory 30 having stored therein a grant list 32 and a risk list 34. The grant list 32 includes at least one authorized face ID, which corresponds to at least the user's face. Additional face IDs may be included in the grant list. The risk list 34 includes at least one identified object 72(1), 72(2) that presents a risk to the user's operating environment 70.

A processor 40 is coupled to the memory 30 and the camera 22. The processor 40 is configured to execute a user application 36 that requires sensitive information to be entered by the user. The user application 36 may be stored in the memory 30. The processor 40 and memory 30 may be separate from one another, as illustrated. In other embodiments, the processor 40 and memory 30 may be packaged together. In this embodiment, the processor 40 would run in the memory 30. The processor 40 activates the camera 22 prior to the sensitive information being entered by the user 50.

After the camera 22 has been activated, the processor 40 operates an analyze engine 42. The analyze engine 42 analyzes an image as provided by the activated camera 22. The image is initially analyzed in view of the grant list 32, and then the risk list 34. The analyze engine 42 includes an object recognition algorithm, such as Faster R-CNN, for example.

With the grant list 32, the analyze engine 42 compares an image of the user's face to the face ID(s) in the grant list 32. If the user's face is validated, then any detected objects in the image other than the user's face are compared to the identified objects in the risk list 34.

One of the identified objects 72(1) is a second face that is detected within the user's operating environment 70, and the second face 72(1) does not correspond to an authorized face ID in the grant list 32. Another identified object 72(2) is an external camera in proximity of the computing device 20 within the user's operating environment 70. The identified objects 72(1), 72(2) may be generally referred to as identified objects 72.

The analyze engine 42 alerts the user 50 of a risk for leakage of the sensitive information to be entered into the user application 36 based on detection of at least one object 72 in the analyzed image that is in the risk list 34.

A display 24 is coupled to the processor 40. The processor 40 is configured to visually alert the user 50 via the display 24. In other embodiments, the alert may be an audio alert. After the alert, the user 50 has an option to ignore the alert and continue with entering the sensitive information. Alternatively, the processor 40 blocks input of the sensitive information based on the alert.

The processor 40 is configured to activate the camera 22 based on hooking an application program interface (API) used to input the sensitive information into the user application 36. The hooking is based on an application 38 running in the background that monitors the user application 36 so as to know when to hook the API before the sensitive information is to be entered.

Alternatively, the processor 40 activates the camera 22 based on the user application 36 notifying when the sensitive information is to be entered. The manufacturer or developer of the user application 36 has modified the user application to activate the camera 22 before the sensitive information is to be entered.

Figure 4:
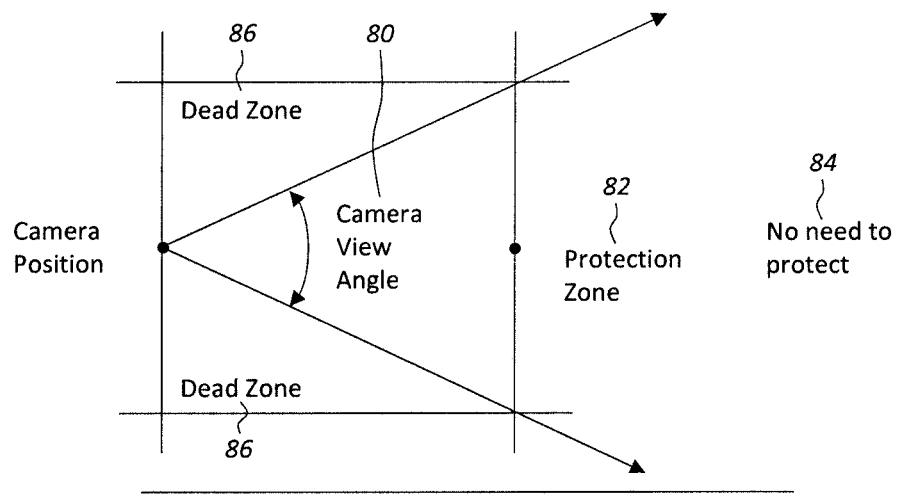
FIG. 4 is a camera view angle representation identifying a protection zone for the computing device illustrated in FIG. 3.

The camera 22 carried by the computing device 20 has a camera view angle 80 associated therewith, as illustrated in FIG. 4. The camera view angle 80 defines a protection zone 82 within the user's operating environment 70. The size of the protection zone 82 is based on the range or performance of the camera 22. The area 84 beyond the camera's range does not need to be protected. The images provided by the activated camera 22 are thus analyzed within the protection zone 82. The areas 86 outside of the protection zone 82 are referred to as dead zones and do not appear in the analyzed images.

Figure 5:
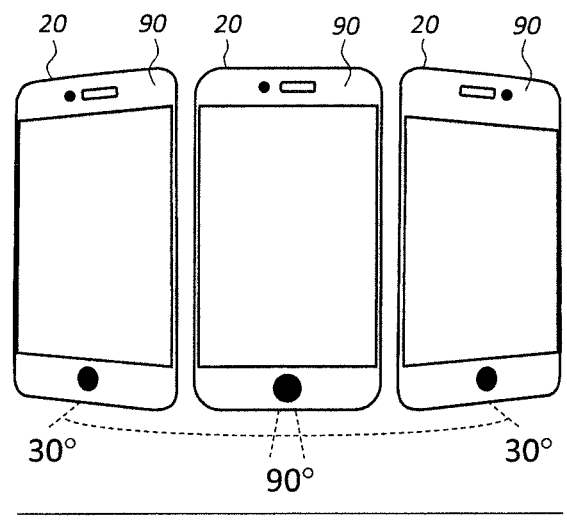
FIG. 5 is one embodiment of the computing device with an anti-view protector so viewing of the display is limited to within the protection zone as illustrated in FIG. 4.

To provide leakage protection when a person 72(1) is within the dead zone 86 while viewing the display 24 of the computing device 20, an anti-view protector 90 is placed over the display 24, as illustrated in FIG. 5. The anti-view protector 90 allows the user 50 to view the display 24 when in the protection zone 82 but prevents a person from viewing the display 24 when in a dead zone 86.

The anti-view protector 90 makes the display 24 appear as a dark screen when viewed by a person 72(1) from the side. Consequently, this person 72(1) is not able to view the sensitive information as it is entered. When the anti-view protector 90 is viewed straight on by the user 50, the display 24 is clear.

Figure 6:
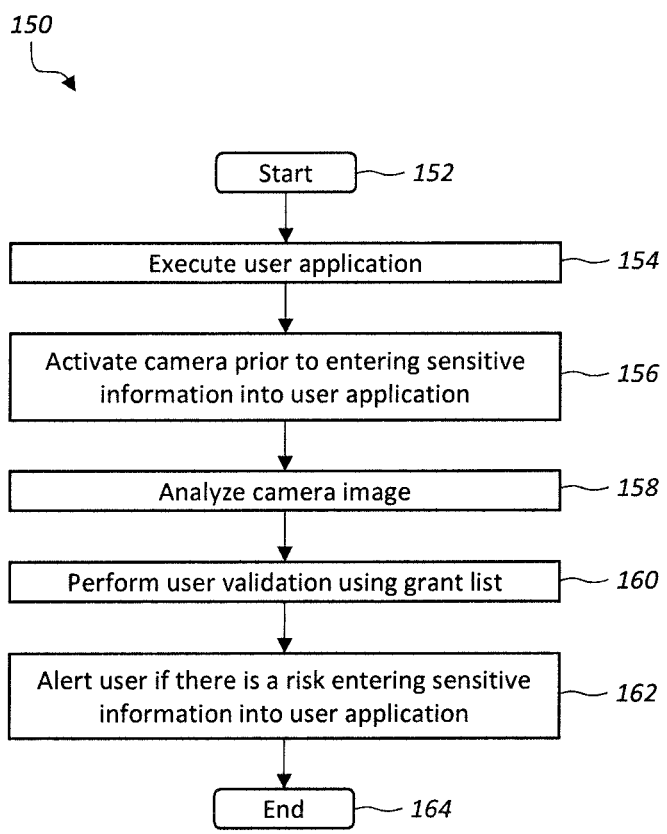
FIG. 6 is a general flowchart illustrating a method for operating the computing device illustrated in FIG. 3.

Generally speaking for the flowchart 150 in FIG. 6, a method for operating the computing system 20 includes from the start (Block 152), executing a user application 36 that requires sensitive information to be entered by the user 50 at Block 154. The camera 22 is activated at Block 156 prior to the sensitive information being entered by the user 50. An image as provided by the activated camera 22 is analyzed at Block 158. The user 50 is validated at Block 160 based on the analyzed image and the at least one face ID in the grant list 32. The user 50 is alerted at Block 162 if there is risk for leakage of the sensitive information to be entered into the user application 36 based on detection of at least one object 72 in the analyzed image that is in the risk list 34. The method ends at Block 164.

Figure 7:
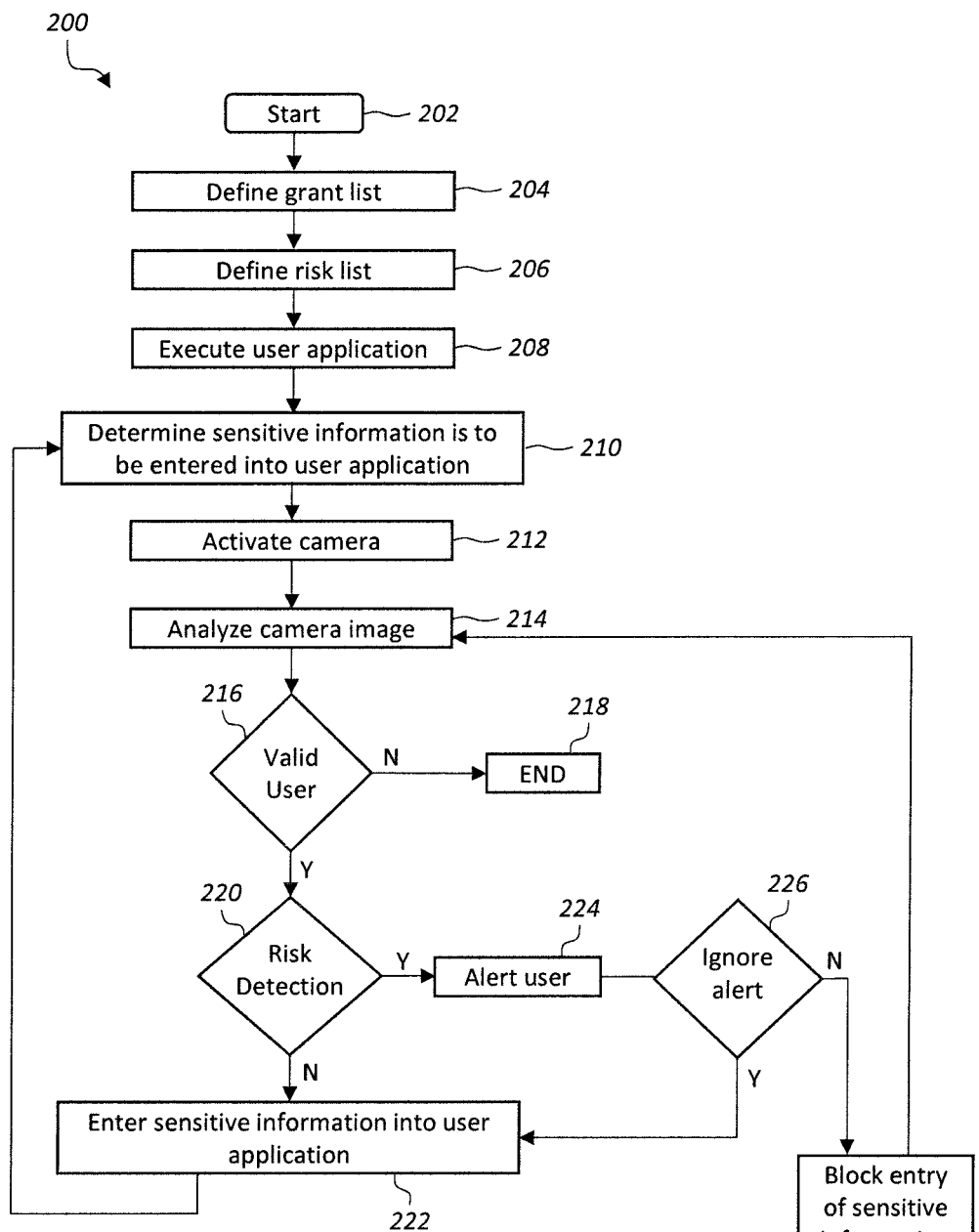
FIG. 7 is a more detailed flowchart illustrating a method for operating the computing system illustrated in FIG. 3.

Referring now to the flowchart 200 in FIG. 7, more detailed steps for operating the computing system 20 will be discussed. From the start (Block 202), the grant list 32 is defined at Block 204. A face of the user 50 is photographed and loaded into the grant list 32. Any other authorized faces can be loaded into the grant list 32. The risk list 34 is defined at Block 206. Objects 72 that may present a risk to the user 50 when entering sensitive information into the user application 36 are loaded into the risk list 34.

Both the grant list 32 and the risk list 34 may be customized by the user 50. The risk list 34, for example, includes when a second face 72(1) is in the analyzed image, and the second face 72(1) does not correspond to an authorized face ID in the grant list 32. The risk list 34 may also include when an external camera 72(2) is in proximity of the computing device 20.

The user application 36 is executed at Block 208. A determination is made at Block 210 as to whether sensitive information is to be entered into the user application 36. As noted above, a background application 38 may be running in the background to monitor the user application 36. The background application 38 is configured to hook an API used to input the sensitive information into the user application 36. Alternatively, the user application 36 may be modified to report when the API for allowing sensitive information is be accessed.

When it is determined that sensitive information is to be entered, then the camera 22 is activated at Block 212. An image from the activated camera 22 is analyzed at Block 214. The analyze engine 42 includes an object recognition algorithm. The image is analyzed by the object recognition algorithm in view of the grant list 32 and the risk list 34.

A determination is made at Block 216 if an image of the user's face matches the face ID stored in the grant list 32. If the user 50 is not validated, then the method ends at Block 218.

If the user's face is validated, then a determination is made at Block 220 if the image includes an object from the risk list 34. If the analyze engine 42 determines that there are no objects from the risk list 34 in the analyzed image, then the user 50 is able to enter the sensitive information at Block 222 into the user application 36. After the sensitive information has been entered, the method loops back to Block 210 to determine when the next sensitive information is to be entered into the user application 36.

If the analyze engine 42 determines that there is at least one object from the risk list 34 in the analyzed image, then the user 50 is alerted at Block 224. The alert may be a visual and/or audio alert. The analyze engine 42 is able to zoom in on the image so that the object recognition algorithm detects or identifies objects within the image.

After the user 50 is alerted, the user has the option to ignore the alert. In this case, the user 50 is able to enter the sensitive information into the user application 36 at Block 222. If the user 50 does not ignore the alert, then entry of the sensitive information is blocked as Block 228. The method loops back to Block 214 to see if there are no longer any objects from the risk list 34 in the analyzed image.

Another aspect is directed to a non-transitory computer readable medium for a computing device 20 comprising a camera 22, and a memory 30 having stored therein a grant list 32 and a risk list 34. The grant list 32 includes at least one authorized face ID, and the risk list 34 includes at least one object 72 that presents a risk to the user's operating environment 70.

The non-transitory computer readable medium has a plurality of computer executable instructions for causing the computing device to perform steps comprising operating a processor 40 coupled to the memory 30 and the camera 22 to execute a user application 36 that requires sensitive information to be entered by the user 50, activate the camera 22 prior to the sensitive information being entered by the user 50, and operate an analyze engine 42.

The analyze engine 42 is operated to analyze an image as provided by the activated camera 22, and validate the user 50 based on the analyzed image and the at least one face ID in the grant list 32. The user 50 is alerted of a risk for leakage of the sensitive information to be entered into the user application 36 based on detection of at least one object 72 in the analyzed image that is in the risk list 34.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

That which is claimed:

1. A computing device comprising:
a camera;
a memory having stored therein a grant list and a risk list, with the grant list including at least one authorized face ID, and with the risk list including at least one identified object that presents a risk to the user's operating environment; and
a processor coupled to said memory and said camera and configured perform the following:
execute a user application that requires sensitive information to be entered by the user,
activate said camera prior to the sensitive information being entered by the user, and
operate an analyze engine to perform the following:
analyze an image as provided by said activated camera,
validate the user based on the analyzed image and the at least one face ID in the grant list, and
in response to a validated user, alert the user of a risk for leakage of the sensitive information to be entered into the user application based on detection of at least one object in the analyzed image that is in the risk list.

2. The computing device according to claim 1 wherein said processor is configured to activate said camera based on hooking an application program interface (API) used to input the sensitive information into the user application.

3. The computing device according to claim 1 wherein said processor activates said camera based on the user application notifying when the sensitive information is to be entered.

4. The computing device according to claim 1 wherein the sensitive information comprises a password for the user application.

5. The computing device according to claim 1 further comprising a display, and wherein said processor is further configured to alert the user via said display.

6. The computing device according to claim 1 wherein said processor is further configured to block input of the sensitive information based on the alert.

7. The computing device according to claim 1 wherein the at least one object that presents a risk to the user's operating environment comprises detection of more than one face in the analyzed image.

8. The computing device according to claim 1 wherein the at least one object that presents a risk to the user's operating environment comprises detection of an external camera in the analyzed image.

9. The computing device according to claim 1, and further comprising: 1 wherein said camera has a camera view angle defining a protection
a display; and
an anti-view screen protector carried by said display so that the display cannot be viewed from outside the protection zone.

10. A method for operating a computing device comprising a camera; and a memory having stored therein a grant list and a risk list, with the grant list including at least one authorized face ID, and with the risk list including at least one object that presents a risk to the user's operating environment, the method comprising:
operating a processor coupled to the memory and the camera to perform the following:
execute a user application that requires sensitive information to be entered by the user,
activate the camera prior to the sensitive information being entered by the user, and
operate an analyze engine to perform the following:
analyze an image as provided by the activated camera,
validate the user based on the analyzed image and the at least one face ID in the grant list, and
in response to a validated user, alert the user of a risk for leakage of the sensitive information to be entered into the user application based on detection of at least one object in the analyzed image that is in the risk list.

11. The method according to claim 10 wherein the processor is configured to activate the camera based on hooking an application program interface (API) used to input the sensitive information into the user application.

12. The method according to claim 10 wherein the processor activates the camera based on the user application notifying when the sensitive information is to be entered.

13. The method according to claim 10 wherein the computing device further comprises a display, and wherein the processor is further configured to alert the user via the display.

14. The method according to claim 10 wherein the processor is further configured to block input of the sensitive information based on the alert.

15. The method according to claim 10 wherein the at least one object that presents a risk to the user's operating environment comprises detection of more than one face in the analyzed image.

16. The method according to claim 10 wherein the at least one object that presents a risk to the user's operating environment comprises detection of an external camera in the analyzed image.

17. A non-transitory computer readable medium for operating a computing device comprising a camera; and a memory having stored therein a grant list and a risk list, with the grant list including at least one authorized face ID, and with the risk list including at least one object that presents a risk to the user's operating environment, and with the non-transitory computer readable medium having a plurality of computer executable instructions for causing the computing device to perform steps comprising:
operating a processor coupled to the memory and the camera to perform the following:
execute a user application that requires sensitive information to be entered by the user,
activate the camera prior to the sensitive information being entered by the user, and
operate an analyze engine to perform the following:
analyze an image as provided by the activated camera,
validate the user based on the analyzed image and the at least one face ID in the grant list, and
in response to a validated user, alert the user of a risk for leakage of the sensitive information to be entered into the user application based on detection of at least one object in the analyzed image that is in the risk list.

18. The non-transitory computer readable medium according to claim 17 wherein the computing device further comprises a display, and wherein the processor is further configured to alert the user via the display.

19. The non-transitory computer readable medium according to claim 17 wherein the at least one object that presents a risk to the user's operating environment comprises detection of more than one face in the analyzed image.

20. The non-transitory computer readable medium according to claim 17 wherein the at least one object that presents a risk to the user's operating environment comprises detection of an external camera in the analyzed image.

* * * * *